United States Patent
Ribaldone et al.

(10) Patent No.: US 9,359,017 B2
(45) Date of Patent: Jun. 7, 2016

(54) SYSTEM FOR CONTROLLING THE AERODYNAMIC DRAG OF A MOTOR VEHICLE, DESIGNED TO CAUSE DETACHMENT OF THE BOUNDARY LAYER IN A PREDETERMINED AREA OF THE MOTOR-VEHICLE BODY, USING PASSIVE JETS, AND MOTOR VEHICLE EQUIPPED WITH THIS SYSTEM

(71) Applicant: C.R.F. SOCIETÀ CONSORTILE PER AZIONI, Orbassano (Turin) (IT)

(72) Inventors: Enrico Ribaldone, Turin (IT); Matteo Giusti, Turin (IT)

(73) Assignee: C.R.F. SOCIETÀ CONSORTILE PER AZIONI, Orbassano (Turin) (IT)

( * ) Notice: Subject to any disclaimer, the term of this patent is extended or adjusted under 35 U.S.C. 154(b) by 0 days.

(21) Appl. No.: 14/452,098

(22) Filed: Aug. 5, 2014

(65) Prior Publication Data
US 2015/0084371 A1    Mar. 26, 2015

(30) Foreign Application Priority Data
Sep. 23, 2013    (EP) ..................................... 13185488

(51) Int. Cl.
   *B62D 35/00*      (2006.01)
   *B62D 37/02*      (2006.01)
   *B62D 25/04*      (2006.01)

(52) U.S. Cl.
CPC ................ *B62D 35/00* (2013.01); *B62D 25/04* (2013.01); *B62D 37/02* (2013.01)

(58) Field of Classification Search
CPC .... B62D 25/02; B62D 25/04; B62D 235/001; B62D 235/002; B62D 235/005; B62D 235/007; B62D 235/008; B62D 235/02; B62D 37/02; B62D 35/001; B62D 35/002; B62D 35/005; B62D 35/007; B62D 35/008; B62D 35/02
USPC .......... 296/180.1, 180.2, 180.3, 180.4, 180.5, 296/181.1, 181.5
See application file for complete search history.

(56) References Cited

U.S. PATENT DOCUMENTS

| | | | |
|---|---|---|---|
| 3,529,862 A | | 9/1970 | Jousserandot |
| 4,343,506 A | * | 8/1982 | Saltzman .................... 296/24.31 |

(Continued)

FOREIGN PATENT DOCUMENTS

| | | |
|---|---|---|
| EP | 462511 A1 * | 12/1991 |
| FR | 2 890 637 | 3/2007 |
| FR | 2 930 229 | 10/2009 |

OTHER PUBLICATIONS

European Search Report EP 13185488.7 dated Mar. 25, 2014.

*Primary Examiner* — Jason S Daniels
(74) *Attorney, Agent, or Firm* — Nixon & Vanderhye P.C.

(57) ABSTRACT

A system for controlling the aerodynamic drag of a motor vehicle includes a porous wall that closes externally a chamber obtained within a component of the structure of the motor vehicle in such a way that, when the motor vehicle is travelling, a first part of the pores situated in an area of the aerodynamic field of the vehicle with higher relative pressure enables part of the flow of air that laps the vehicle to enter the chamber. A part of the pores situated in an area of the aerodynamic field of the vehicle with lower relative pressure functions as an outlet for the flow of air from the chamber towards the outside of the vehicle in such a way as to generate jets of air that cause detachment of the boundary layer.

9 Claims, 5 Drawing Sheets

(56) References Cited

U.S. PATENT DOCUMENTS 4,881,772 A * 11/1989 Feinberg .................... 296/180.1
5,407,245 A * 4/1995 Geropp ...................... 296/180.1
6,616,218 B2 9/2003 Bauer et al.
2011/0133511 A1 * 6/2011 Hayashi et al. ............ 296/181.5

* cited by examiner

SYSTEM FOR CONTROLLING THE AERODYNAMIC DRAG OF A MOTOR VEHICLE, DESIGNED TO CAUSE DETACHMENT OF THE BOUNDARY LAYER IN A PREDETERMINED AREA OF THE MOTOR-VEHICLE BODY, USING PASSIVE JETS, AND MOTOR VEHICLE EQUIPPED WITH THIS SYSTEM

This application claims priority to European Patent Application EP 13185488.7 filed 23 Sep. 2013, the entire contents of which is hereby incorporated by reference.

FIELD OF THE INVENTION

The present invention relates to a system for controlling the aerodynamic drag of a motor vehicle, designed to cause detachment of the boundary layer at a predetermined area of a part of the motor-vehicle body. The subject of the invention is also a motor vehicle equipped with the above system.

The document No. U.S. Pat. No. 6,616,218 B2 shows a vehicle, in particular the trailer of a lorry, which in its rear part comprises a gap defined by an outer wall that defines the rear wall of the trailer and two side walls of the trailer adjacent to the rear wall and orthogonal thereto so as to form two vertical corners. The aforesaid outer wall has holes for passage of air both in side portions and in the portion that defines the rear wall of the trailer. In this way, when the vehicle is travelling, the air that laps the vehicle enters the gap through the holes made in the side walls and exits from the gap through the holes made in the rear wall of the trailer. In this way, from the rear wall of the trailer there exit jets of air defined as "passive", i.e., generated as the simple effect of the movement of the vehicle, without any need to use devices for generating jets of air of an active type. The aim of the aforesaid known device is to reduce the aerodynamic drag of the vehicle by modifying the aerodynamic field in the rear area of the vehicle, without, however, modifying the area of detachment of the boundary layer, which substantially coincides with the corners formed between the side walls and the rear wall.

SUMMARY OF THE INVENTION

The object of the present invention is to exploit the principle of passive jets known from the above document for selecting and, if necessary, modifying the area of the body of the vehicle where detachment of the boundary layer occurs.

With a view to achieving the aforesaid object, the subject of the invention is a system of the type referred to above, comprising at least one component of the structure of the motor vehicle constituting a separate element rigidly connected to the aforesaid structure, wherein this component defines an outer wall of the motor vehicle, wherein the outer wall is made porous, with an orderly distribution of pores or holes, and wherein the porous wall closes externally a chamber obtained within the aforesaid component of the structure of the motor vehicle in such a way that, when the motor vehicle is travelling, a first part of the pores or holes situated in an area of the aerodynamic field of the vehicle with higher relative pressure enables part of the flow of air that laps the vehicle to enter said chamber, whereas a part of the pores or holes situated in an area of the aerodynamic field of the vehicle with lower relative pressure functions as outlet for the flow of air from the aforesaid chamber towards the outside of the vehicle in such a way as to generate jets of air that cause detachment of the boundary layer, the position of the pores or holes situated in an area of the aerodynamic field of the vehicle with lower relative pressure being chosen so as to determine detachment of the boundary layer in a desired area.

In a preferred embodiment, the aforesaid component defines a curved outer wall of the motor vehicle that radiuses without forming any corners a respective side of the motor vehicle with the rear wall of the motor vehicle.

In the above preferred embodiment, the system comprises a number of components, each produced with the aforesaid curved porous wall and with the aforesaid internal chamber, one of these components constituting at least part of the so-called "C-upright" of the motor vehicle and the other components defining the outer surface of the motor vehicle underneath the C-upright.

Thanks to the above characteristics, the system according to the invention may also be easily adapted on a motor vehicle originally not equipped with this system by replacing a component forming part of the structure of the motor vehicle with a similar hollow component, having an outer wall that constitutes the aforesaid porous curved outer wall.

The system according to the invention consequently enables the designer to optimize the aerodynamic characteristics of the motor vehicle and moreover enables, for one and the same motor vehicle, the aerodynamic characteristics to be varied in time by modifying one or more components of the motor vehicle according to specific requirements (consider, for example, a sports car, the aerodynamic characteristics of which have to be adapted according to the characteristics of the circuit on which a competition is held).

BRIEF DESCRIPTION OF THE FIGURES

Further characteristics and advantages of the present invention will emerge from the ensuing description, with reference to the annexed drawings, which are provided purely by way of non-limiting example and in which.

DETAILED DESCRIPTION OF THE INVENTION

Figure 1:
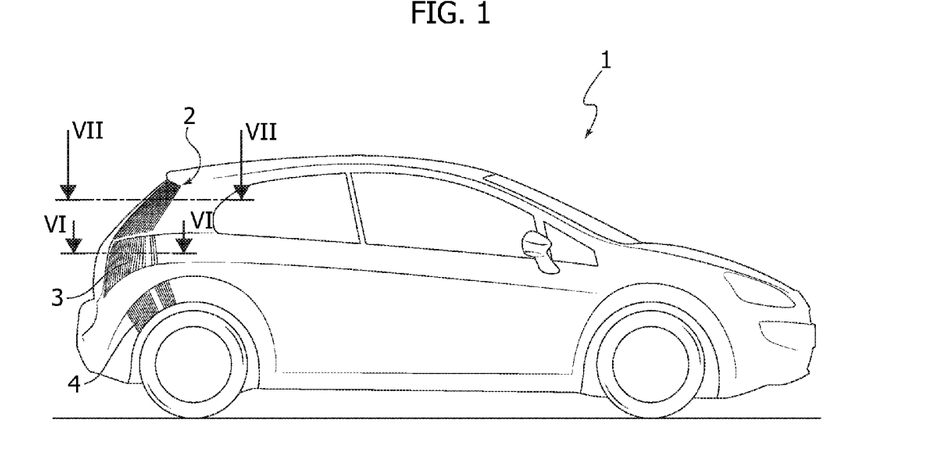
FIG. 1 is a schematic side view of a motor vehicle according to the invention.
Figure 2:
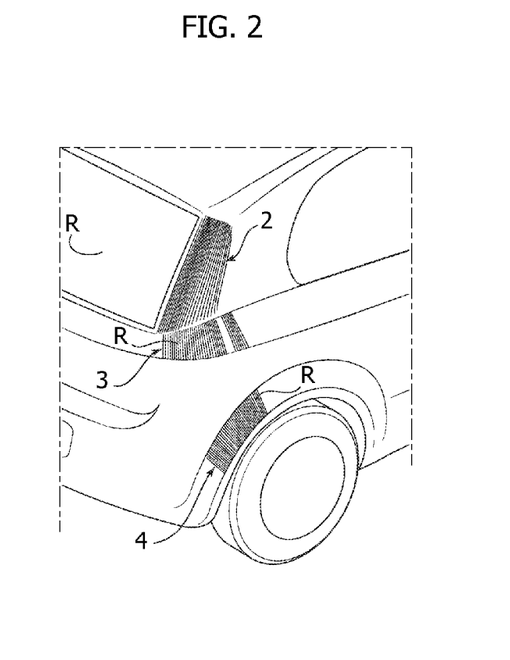
FIG. 2 is a perspective view at an enlarged scale of the right-hand rear corner of the motor vehicle of FIG. 1.

In FIG. 1, the reference number 1 designates as a whole a motor car equipped with the system according to the invention. In the embodiment illustrated, the system according to the invention is applied to three different components of the structure of the motor car 1, in the rear part of the motor car, on each side. These components are: a portion of the rear upright or C-upright designated by the reference number 2 (which in the original version of the motor vehicle to which the invention has been applied by way of example is normally occupied by the rear light), a component 3 of the bodywork of the motor car set underneath the portion 2, and a component 4 forming part of a rear side mudguard of the motor car.

As may be seen, the example illustrated refers to a motor car of the fastback type. Of course, the invention may be applied also to a motor car of the sedan type, in which case the system can be applied, for example, to the component that constitutes the C-upright of the motor car and to the rear end part of the body of the motor car, on each side.

Figure 4:
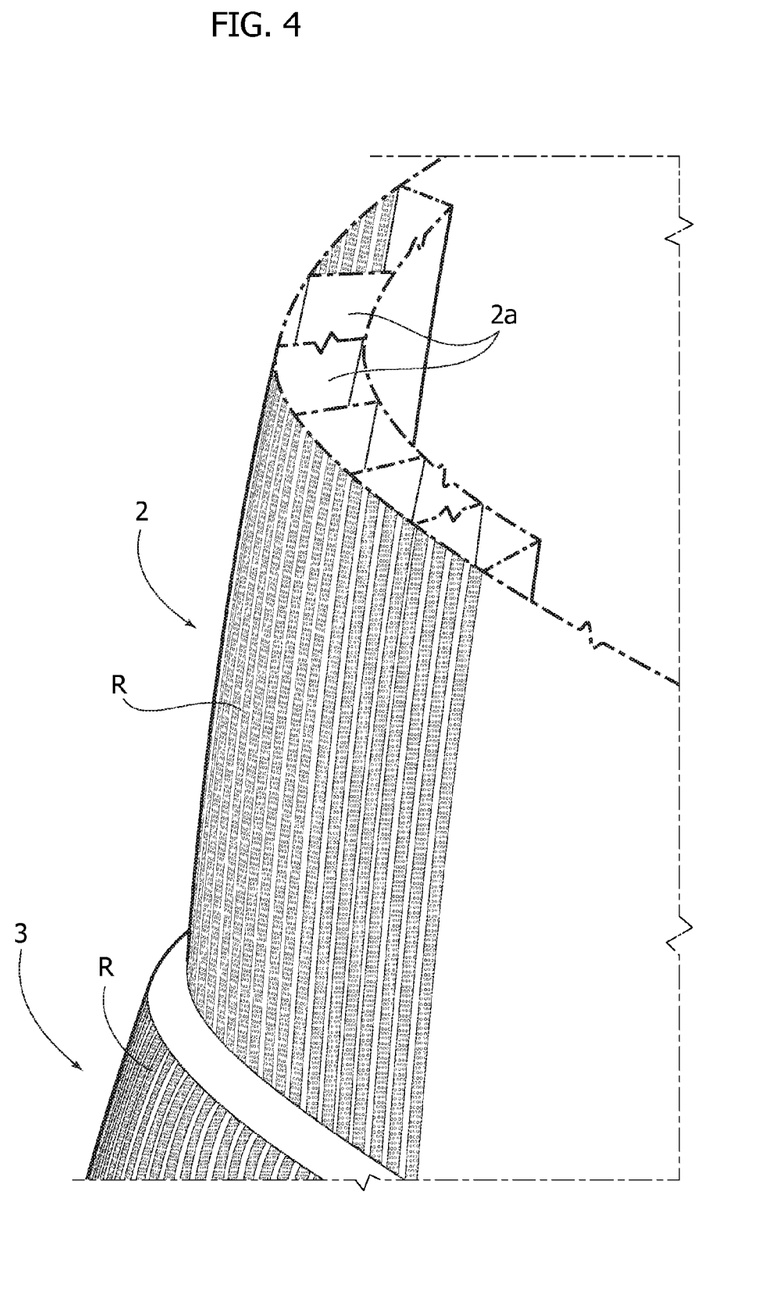
FIG. 4 is a further perspective view at an enlarged scale of a detail of the motor vehicle of FIG. 1.

To return to the example illustrated, each of the components 2, 3, 4 provided on each side of the rear part of the motor car constitutes a component in itself, having a hollow structure made, for example, of sheet metal or of plastic material. The hollow structure of the component is, for example, clearly illustrated in FIG. 4 for the component 2. In the example illustrated in FIG. 4, the component 2 also has a plurality of internal diaphragms 2*a*. In a concrete embodiment, these internal diaphragms have been prearranged in a removable way within the component 2 to enable tests to be conducted on the efficiency of the system according to the invention, modifying the volume of the internal chamber of the component. In the embodiment in line with normal production, however, the internal diaphragms 2*a* are not envisaged.

Each of the components 2, 3, 4 is rigidly connected to the remaining part of the structure of the motor vehicle. In a possible variant, connection of one or more of the components 2, 3, 4 to the structure of the motor vehicle is removable to enable easy and fast replacement of the component with a similar component having, however, a different conformation of the system according to the invention in order to modify the characteristics of the aerodynamic field around the motor vehicle when it is travelling, according to what will be described in greater detail in what follows.

As may be seen clearly in the drawings, each of the components 2, 3, 4 has a hollow structure delimited externally by a curved wall R that radiuses in a gradual way, i.e., without any corners, each side wall of the motor vehicle with the rear wall of the motor vehicle.

Figure 3:
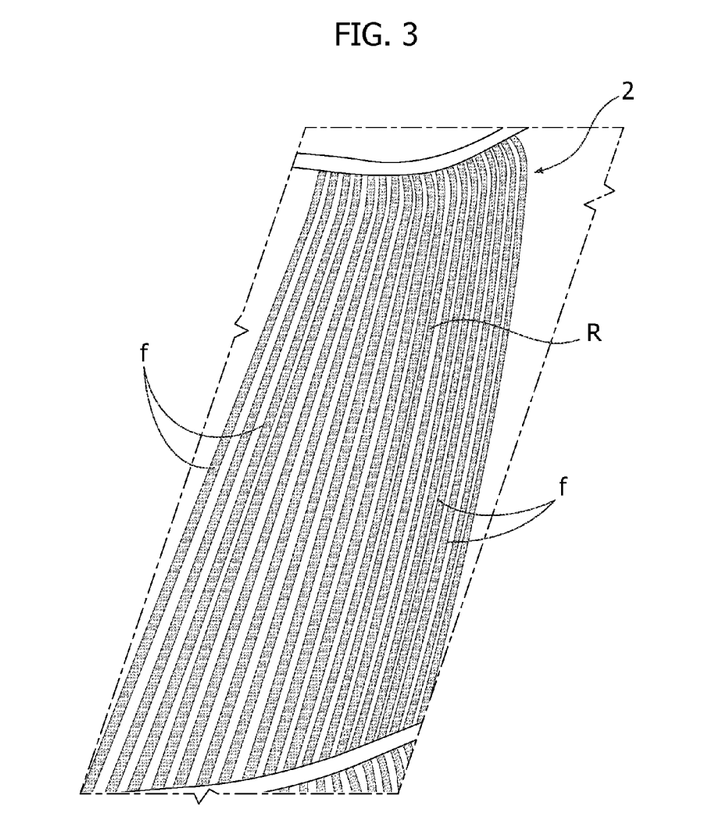
FIG. 3 is a view at a further enlarged scale of a detail of FIG. 2.
Figure 3A:
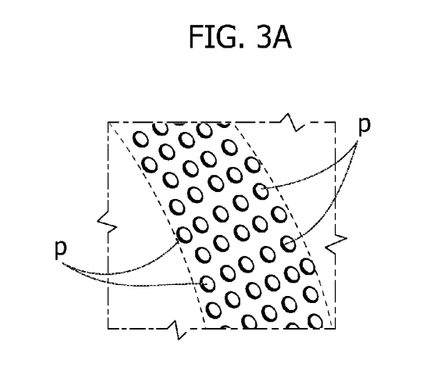
FIG. 3A is a view at a further enlarged scale of a detail of FIG. 3.

As may be seen in the drawings and in particular in the detail of FIG. 3A, the curved outer wall R of each component 2, 3, 4 has a distribution of holes or pores p both in an area of the aerodynamic field of the vehicle with higher relative pressure (in the case in point on the portion of the wall R that extends on one side of the motor vehicle) and in an area of the aerodynamic field of the vehicle with lower relative pressure (in the case in point on the portion of the wall R that extends on the rear part of the motor vehicle).

Furthermore, in the example of embodiment illustrated, the pores p are distributed in vertical strips f interspersed by non-porous surface portions.

As a result of the arrangement illustrated, the portion of the holes p that extends in the area of the aerodynamic field of the vehicle with higher relative pressure—the front part of each wall R—on each side of the motor vehicle, enables the part of the flow of air that laps the vehicle when it is travelling to enter the chamber of each component 2, 3, 4. Likewise, the part of the pores or holes p that extends in the area of the aerodynamic field of the vehicle with higher relative pressure—the rear portion of each wall R—on the rear side of the motor vehicle, enables the flow of air that has entered the chamber to exit again, thus generating jets of air of a passive type (i.e., generated simply as a result of the movement of the motor vehicle, without any need for providing any active generator) that modify the aerodynamic field around the motor vehicle.

According to the invention, the above phenomenon is exploited for predetermining the area of the radiusing wall R where the boundary layer of the air that laps the vehicle when it is travelling detaches from the motor-vehicle body, thus forming the wake.

It should be noted that the chamber defined within the hollow structure of the component (2, 3, 4 in the example described) must have a minimum thickness (which the person skilled in the field may choose on the basis of tests) in order to be able to process a flow of air sufficient for operation of the system in the range of the normal speeds of advance of a motor vehicle.

In this way, it is possible, in the stage of design of the motor vehicle, to provide the components 2, 3, 4 and the distribution of holes p of their outer radiusing surfaces R in such a way as to obtain detachment of the wake in the area of the motor vehicle that is most suited to enabling the best aerodynamic performance of the motor vehicle.

Since the system according to the invention is obtained by providing the porous radiusing surface R on an independent component 2 and/or 3 and/or 4 of the motor vehicle, it is also possible to replace the component that was originally provided with this component in order to modify in a desired way the aerodynamic characteristics of the motor vehicle. This aspect may be particularly advantageous, for example, in racing cars, where it may be required to modify the aerodynamic characteristics of the motor vehicle according to the circuit on which the car has to compete.

FIGS. 5-8 of the annexed drawings show the advantages of the present invention.

Figure 5:
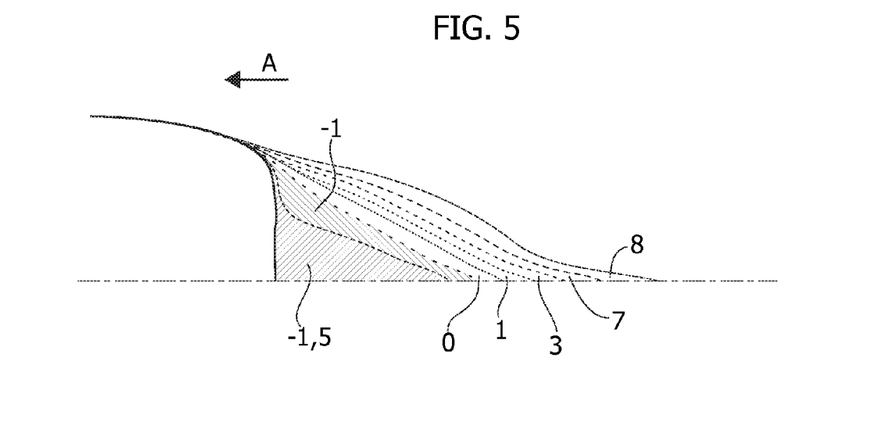
FIGS. 5-8 are diagrams that show the effects of the present invention.
Figure 6:
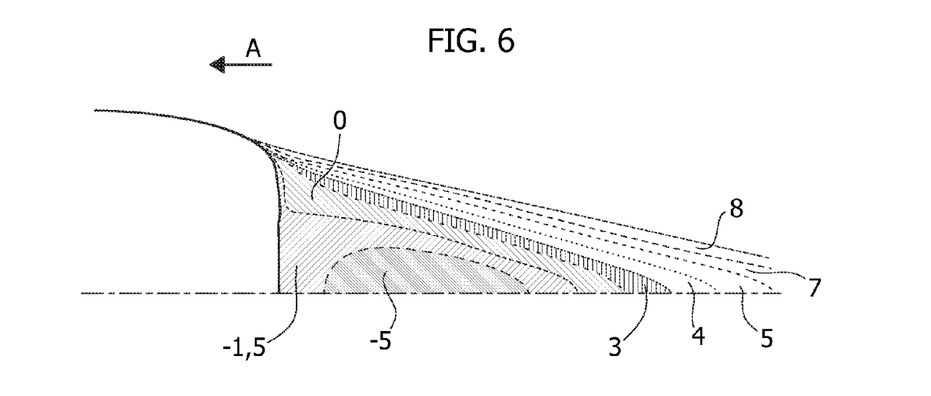

FIG. 5 is a cross-sectional view in a horizontal plane, according to the line VI-VI of FIG. 1. FIG. 5 shows the aerodynamic field in a motor vehicle of the type illustrated in FIG. 1 that is not equipped with the system according to the invention, whereas FIG. 6 shows the result of application of the invention. The rear area to the motor vehicle has been divided into areas identified approximately with one and the same pressure value. As may be seen, application of the invention enables passage from a configuration of the type illustrated in FIG. 5 to the configuration illustrated in FIG. 6 where there is even created an area with negative values (corresponding to a thrust of the air against the rear part of the motor vehicle in the rear area of the latter (in the figures the arrow A indicates the direction of advance of the motor vehicle).

Figure 7:
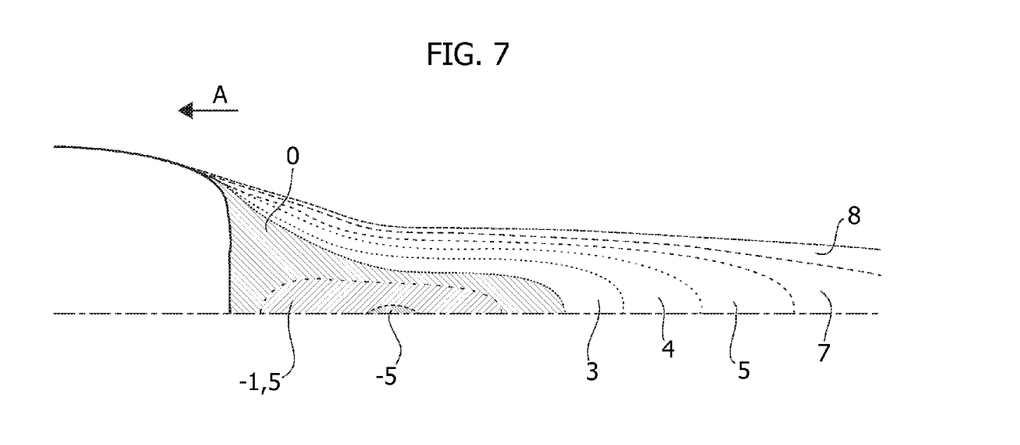
Figure 8:
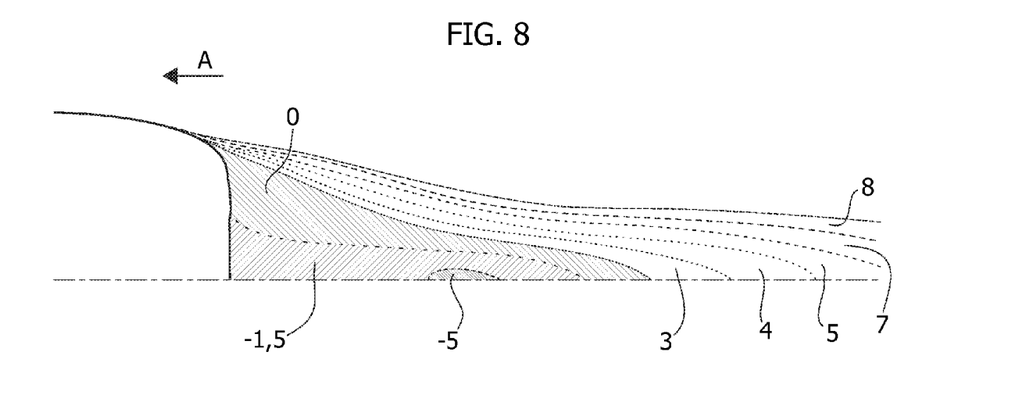

FIGS. 7 and 8 are cross sections according to the line VII-VII of FIG. 1. FIG. 7 regards again the aerodynamic field in the case of a car not equipped with the system according to the invention, whereas FIG. 8 shows the result obtained by applying the system according to the invention. Also in this case the area involved in negative pressure values is increased, with a consequent considerable reduction of the aerodynamic drag of the motor vehicle.

Of course, without prejudice to the principle of the invention, the details of construction and the embodiments may vary widely with respect to what has been described and illustrated herein, purely by way of example, without thereby departing from the scope of the present invention.

In particular, the criterion of choice of the sections for inlet and outlet of the air on the basis of the pressure values of the aerodynamic field of the motor vehicle enables application of the system also to other portions of the motor vehicle itself, without limitation to the one illustrated by way of example in the description. These portions may include, for example, a rear spoiler, the front and rear wheel housings of the vehicle, the underbody, and in general any part of the vehicle that is subject to a relative-pressure gradient of the aerodynamic field and that may be built as described for the component 2, 3, or 4. This moreover makes it possible to avoid providing air intakes or other flow ducts that have the function of carrying the air into the chamber of the component (2, 3, 4 in the example described, or any further component defining the system), which would be decidedly unattractive.

Furthermore, in some embodiments it is possible to provide the chamber within the component with a non-constant section, introducing locally restrictions of section (for example, with profiling of the walls of the chamber) that might induce variations of speed of the air within the chamber.

What is claimed:

1. A system for controlling an aerodynamic drag of a motor vehicle by causing detachment of a boundary layer at a predetermined area of a part of the motor-vehicle, said system comprising at least one component of the structure of the motor vehicle constituting a separate element rigidly connected to said structure,
    wherein said component defines an outer wall of the motor vehicle,
    wherein said outer wall is made porous, with an orderly distribution of pores or holes, and
    wherein said outer porous wall closes externally a chamber obtained within said component of the structure of the motor vehicle in such a way that, when the motor vehicle is travelling, a first part of said pores or holes situated in an area of an aerodynamic field of the vehicle with higher relative pressure enables part of a flow of air that laps the vehicle to enter said chamber, whilst a part of said pores or holes situated in an area of the aerodynamic field of the vehicle with lower relative pressure functions as an outlet for the flow of air from the aforesaid chamber towards an outside of the vehicle in such a way as to generate jets of air that cause detachment of the boundary layer,
    the position of said pores or holes on said outer porous wall situated in the area of the aerodynamic field of the vehicle with lower relative pressure being chosen so as to cause detachment of the boundary layer in a desired area,
    wherein said component defines a curved outer wall of the motor vehicle that radiuses without any corners a respective side of the motor vehicle with a rear wall of the motor vehicle, and
    wherein the system comprises a number of components, each produced with said curved porous wall and with said internal chamber, one of said components constituting at least part a C-upright of the motor vehicle and the other components defining an outer surface of the motor vehicle underneath the C-upright.

2. The system according to claim 1, wherein said pores or holes are distributed in vertical strips parallel and set apart, interspersed by non-porous portions of wall.

3. The system according to claim 1 wherein the curved outer wall and the area of said wall where detachment of the boundary layer is caused are chosen in such a way as to increase the volume of air immediately behind the motor vehicle having a pressure tending to push the motor vehicle in the direction of advance.

4. A motor vehicle, wherein it is provided with a system according to claim 1.

5. A method for controlling an aerodynamic drag of a motor vehicle by causing detachment of a boundary layer in a predetermined area of a rear part of the motor vehicle, wherein the method comprises:
    providing a motor vehicle with at least one component of a structure of the motor vehicle constituting a separate element rigidly connected to said structure and defining an outer wall of the motor vehicle,
    wherein said outer wall is made porous, with an orderly distribution of pores or holes, and
    wherein said porous wall closes externally a chamber obtained within said component of the structure of the motor vehicle in such a way that, when the motor vehicle is travelling, a first part of said pores or holes that is situated in an area of an aerodynamic field of the vehicle with higher relative pressure enables part of a flow of air that laps the vehicle to enter said chamber, whilst a part of said pores or holes situated in an area of the aerodynamic field of the vehicle with lower relative pressure functions as an outlet for the flow of air from the aforesaid chamber towards an outside of the vehicle in such a way as to generate jets of air that cause detachment of the boundary layer,
    choosing a position of said rear pores or holes on said outer wall so as to cause detachment of the boundary layer in a desired area,
    wherein said component defines a curved outer wall of the vehicle that radiuses without any corners a respective side of the motor vehicle with a rear wall of the motor vehicle, and
    wherein a number of components of the motor vehicle are each produced with said curved porous wall and with said internal chamber, one of said components constituting at least part of a C-upright of the motor vehicle and the other components defining an outer surface of the motor vehicle underneath the C-upright.

6. A system for controlling an aerodynamic drag of a motor vehicle by causing detachment of a boundary layer at a predetermined area of a part of the motor-vehicle, said system comprising at least one component of the structure of the motor vehicle constituting a separate element rigidly connected to said structure,
    wherein said component defines an outer wall of the motor vehicle,
    wherein said outer wall is made porous, with an orderly distribution of pores or holes, and
    wherein said outer porous wall closes externally a chamber obtained within said component of the structure of the motor vehicle in such a way that, when the motor vehicle is travelling, a first part of said pores or holes situated in an area of an aerodynamic field of the vehicle with higher relative pressure enables part of a flow of air that laps the vehicle to enter said chamber, whilst a part of said pores or holes situated in an area of the aerodynamic field of the vehicle with lower relative pressure functions as an outlet for the flow of air from the aforesaid chamber towards the outside of the vehicle in such a way as to generate jets of air that cause detachment of the boundary layer,
    the position of said pores or holes on said outer porous wall situated in the area of the aerodynamic field of the vehicle with lower relative pressure being chosen so as to cause detachment of the boundary layer in a desired area,
    wherein said component defines a curved outer wall of the motor vehicle that radiuses without any corners a respective side of the motor vehicle with a rear wall of the motor vehicle,
    wherein the system comprises a number of components, each produced with said curved porous wall and with said internal chamber, one of said components constituting at least part of a C-upright of the motor vehicle and the other components defining an outer surface of the motor vehicle underneath the C-upright.

7. The system according to claim 6, wherein said pores or holes are distributed in vertical strips parallel and set apart, interspersed by non-porous portions of wall.

8. The system according to claim 6, wherein the curved outer wall and the area of said wall where detachment of the boundary layer is caused are chosen in such a way as to increase the volume of air immediately behind the motor vehicle having a pressure tending to push the motor vehicle in the direction of advance.

9. A motor vehicle, wherein it is provided with a system according to claim 6.

* * * * *